(12) United States Patent
Hornick et al.

(10) Patent No.: US 11,331,749 B2
(45) Date of Patent: May 17, 2022

(54) SUPPORT DEVICE WITH SLATS MOUNTED ON A BASIC COMPONENTS, FOR STORING OR TRANSPORTING SINGLE SHEETS OR STACKS OF A PACKAGING MATERIAL

(71) Applicant: BOBST MEX SA, Mex (CH)

(72) Inventors: Paul Hornick, Vufflens-le-Chateau (CH); Francesco Pessotto, Le Mont-sur-Lausanne (CH)

(73) Assignee: Bobst Mex SA, Mex (CH)

( * ) Notice: Subject to any disclaimer, the term of this patent is extended or adjusted under 35 U.S.C. 154(b) by 183 days.

(21) Appl. No.: 16/962,111

(22) PCT Filed: Jan. 9, 2019

(86) PCT No.: PCT/EP2019/025007
§ 371 (c)(1),
(2) Date: Jul. 14, 2020

(87) PCT Pub. No.: WO2019/137828
PCT Pub. Date: Jul. 18, 2019

(65) Prior Publication Data
US 2020/0338667 A1    Oct. 29, 2020

(30) Foreign Application Priority Data

Jan. 15, 2018  (EP) .................................. 18020021

(51) Int. Cl.
*B23K 26/08*  (2014.01)
*B23K 26/38*  (2014.01)
(Continued)

(52) U.S. Cl.
CPC .......... *B23K 26/0838* (2013.01); *B23K 26/38* (2013.01); *B23K 37/0408* (2013.01);
(Continued)

(58) Field of Classification Search
CPC ................ B23K 26/0838; B23K 26/38; B23K 37/0408; B23K 26/16; B23K 2101/18;
(Continued)

(56) References Cited

U.S. PATENT DOCUMENTS

| | | | | |
|---|---|---|---|---|
| 4,678,078 A | * | 7/1987 | Hastem-Muller | ...... B65G 15/52 |
| | | | | 198/690.2 |
| 8,382,087 B2 | * | 2/2013 | Kilian | .................. B23K 26/702 |
| | | | | 269/296 |

(Continued)

FOREIGN PATENT DOCUMENTS

| | | |
|---|---|---|
| CN | 106583948 A | 4/2017 |
| KR | 101128213 B1 | 3/2012 |
| WO | 2017104322 A1 | 6/2017 |

OTHER PUBLICATIONS

International Search Report issued in International Patent Application No. PCT/EP2019/025007 dated Apr. 23, 2019, (2 pages, in English).

*Primary Examiner* — Mark A Deuble
(74) *Attorney, Agent, or Firm* — Bookoff McAndrews, PLLC

(57) ABSTRACT

A Support device (14) for storing or transporting single sheets or stacks of a packaging material is described. It comprises a multitude of slats (32) being arranged on a basic component (34), wherein the slats (32) are in an upright position and spaced from each other in a generally parallel manner such that respective side contour contact sections (36) of the slats (32) form a substantially flat support surface configured to support the single sheets or stacks. Each slat (32) is mounted on the basic component (34) via two connection tongues (52) being arranged on opposite ends of the slat (32), the connection tongues (52) engaging corresponding connection slots (54) being provided on the basic component (34)), wherein two types of slots (54) are pro- (Continued)

Figure 1:
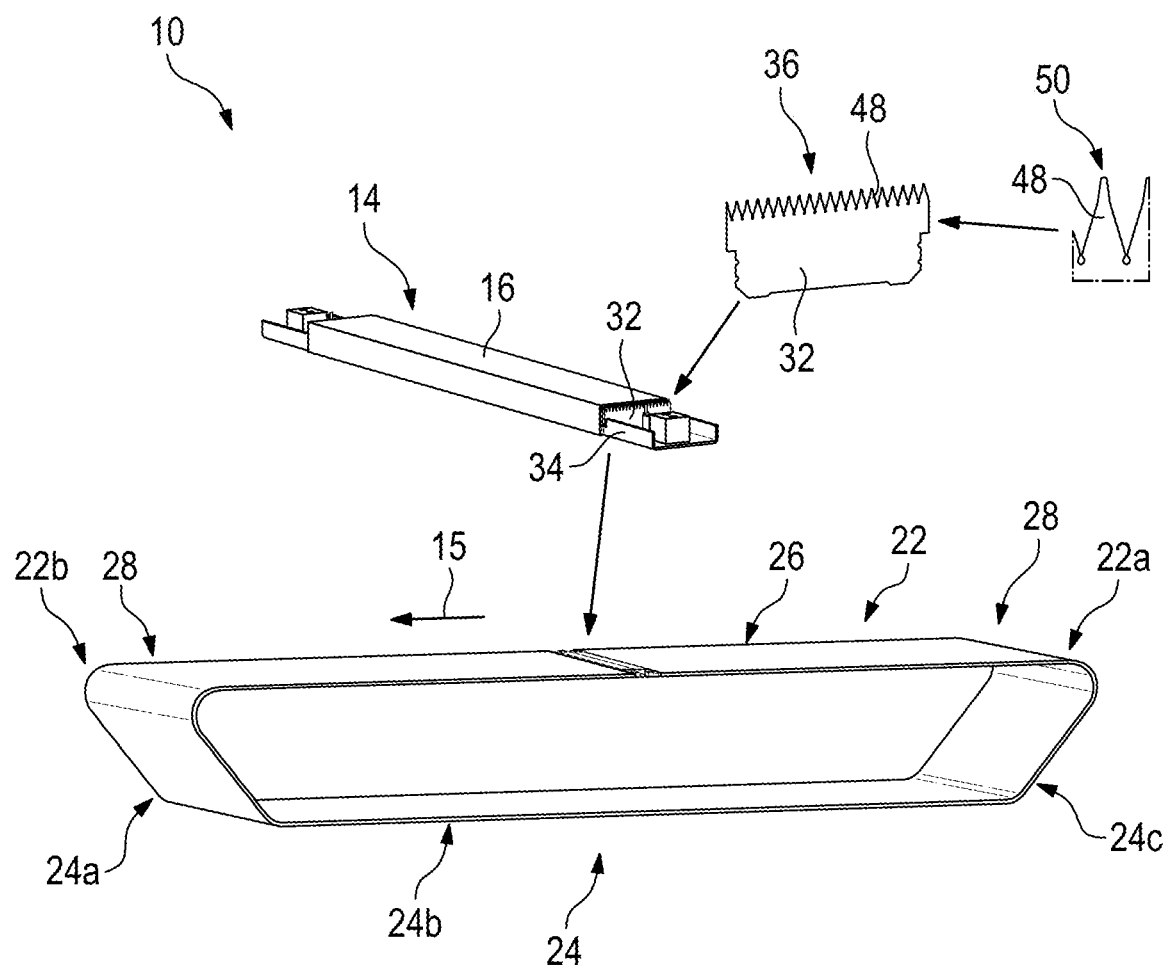

vided on the basic component (34), wherein a first type of slots (54) is arranged closer to a basic surface of the basic component (34) than a second type of slots (54), and wherein two types of slats (32) are provided, wherein a first type of slats (32) is engageable with connection slots (54) of the first type, but not with connection slots (54) of the second type, and a second type of slats (32) is engageable with connection slots (54) of the second type, but not with connection slots (54) of the first type.

13 Claims, 11 Drawing Sheets

(51) Int. Cl.
| | | |
|---|---|---|
| *B23K 37/04* | (2006.01) | |
| *B65G 17/44* | (2006.01) | |
| *B65H 5/02* | (2006.01) | |
| *B65H 5/04* | (2006.01) | |
| *B65G 17/06* | (2006.01) | |
| *B23K 101/18* | (2006.01) | |
| *B23K 26/16* | (2006.01) | |
| *B65G 21/22* | (2006.01) | |

(52) U.S. Cl.
CPC ........... *B65G 17/067* (2013.01); *B65G 17/44* (2013.01); *B65H 5/021* (2013.01); *B65H 5/04* (2013.01); *B23K 26/16* (2013.01); *B23K 2101/18* (2018.08); *B65G 21/22* (2013.01); *B65G 2812/02425* (2013.01); *B65H 2404/2321* (2013.01)

(58) Field of Classification Search
CPC ...... B65G 17/067; B65G 17/44; B65G 21/22; B65G 2812/02425; B65H 5/021; B65H 5/04; B65H 2404/2321; B65H 2402/5152
See application file for complete search history.

(56) References Cited

U.S. PATENT DOCUMENTS

| | | | | |
|---|---|---|---|---|
| 9,266,199 | B2* | 2/2016 | Fox | B23K 26/702 |
| 11,103,967 | B2* | 8/2021 | Lanz | B23K 26/702 |
| 2005/0116396 | A1 | 6/2005 | LeMasson | |
| 2017/0339830 | A1* | 11/2017 | Saraiva | A01D 61/008 |
| 2020/0047297 | A1* | 2/2020 | Schmidt | B23K 37/0408 |
| 2020/0323138 | A1* | 10/2020 | Walker | B65G 15/52 |
| 2020/0407167 | A1* | 12/2020 | Hornick | B65G 17/065 |

* cited by examiner

SUPPORT DEVICE WITH SLATS MOUNTED ON A BASIC COMPONENTS, FOR STORING OR TRANSPORTING SINGLE SHEETS OR STACKS OF A PACKAGING MATERIAL

CROSS-REFERENCE TO RELATED APPLICATION(S)

This application is a National Stage under 35 U.S.C. § 371 of International Application No. PCT/EP2019/025007, filed on Jan. 9, 2019, which claims priority to European Patent Application No. 18020021.4, filed on Jan. 15, 2018, the contents of all of which are incorporated by reference in their entirety.

The invention relates to a support device for storing or transporting single sheets or stacks of a packaging material.

In this context, a stack of a packaging material is to be understood as a plurality of sheets made of the packaging material and being arranged one above the other in a well-defined manner.

Such support devices are usually used in conveyor belt assemblies, which are for example known in the packaging industry.

More specifically, such conveyor belt assemblies are used in packaging material cutting or creasing machines, in which the cutting or creasing is performed on-the-fly, i.e. the packaging material is cut or creased while being transported through the machine.

Usually the packaging material to be cut is held on one or more support devices, which are mounted on the conveyor belt. In known configurations, vacuum is used to fix the packaging material to the support device. A vacuum source, e. g. vacuum pump, is arranged under a conveying section of the conveyor belt assembly, cooperating with vacuum exhausters holding the packaging material.

It is a general aim in the packaging industry to provide support devices, which are able to store or transport the packaging material in a very precise manner. This means that a precise position of the sheet needs to be assured. Furthermore, the packaging material needs to lie on the support device in a flat manner, i.e. the packaging material should not be bent in any direction.

Especially when using laser cutting technology, the contact area between the support device and the packaging material is to be chosen as small as possible. This is due to the fact that fumes originating from the laser cutting process can be trapped in small gaps between the packaging material and the support device. This leads to so called fume deposition marks on the packaging material, which are undesirable.

When the support device is used for storing single sheets or stacks of a packaging material, the sheets or stacks are located on the support device and the support device is generally not moved. Preferably, support devices can be used for storing sheets or stacks in a waiting area of a packaging material processing machine. In this area the sheets or stacks can be "parked" until it is their turn to be processed on the machine. Of course, it is also possible to use the support devices independently of processing machines. They can for example be used to form the storing surface of a rack, a shelf or a table.

It is an object of the present invention to provide an improved support device. Additionally, the support device shall be easy to manufacture and assemble.

This problem is solved by a support device of the type mentioned above, comprising a multitude of slats being arranged on a basic component, wherein the slats are in an upright position and spaced from each other in a generally parallel manner such that respective side contour contact sections of the slats form a substantially flat support surface configured to support the single sheets or stacks, wherein each slat is mounted on the basic component via two connection tongues being arranged on opposite ends of the slat, the connection tongues engaging corresponding connection slots being provided on the basic component, wherein two types of slots are provided on the basic component, wherein a first type of slots is arranged closer to a basic surface of the basic component than a second type of slots, and wherein two types of slats are provided, wherein a first type of slats is engageable with connection slots of the first type, but not with connection slots of the second type, and a second type of slats is engageable with connection slots of the second type, but not with connection slots of the first type. Thus, the slats form a kind of grid suitable for supporting packaging material and thereby avoiding bends or kinks in the packaging material. At the same time, especially when compared to a continuous support surface, the contact area between packaging material and the support device is very small. Consequently, an amount and a size of potential cavities where fumes can be trapped between the side contour contact sections of the support device and the packaging material are comparatively small. When speaking about a substantially flat support surface, this surface also can be formed by a multitude of tooth tips generating a virtual plane. The purpose thereof is to support the sheet or the stack in a flat manner, i.e. without bending or kinking the sheets. Mounting the slats on the basic component via tongues and slots results in a reliable connection between the slats and the basic component. Furthermore, the assembly can be done without tools and therefore is easy and economical. The provision of two types of slots and two types of slats makes it impossible to make a mistake during assembly and mount a slat of the first type to slots of the second type (Poka Yoke). Using two different types of slats offers the possibility to adapt a support surface formed by respective side contour contact sections of the slats to different kinds of packaging material or different processes by which the packaging material is treated.

The packaging material can be paper, cardboard or a plastic material. Also sheets made of a plurality of materials are possible. Such packaging material sheets for example comprise a layer of paper or cardboard covered with a layer of plastic, which also can be called a coating.

According to an embodiment the basic component is a U-shaped profile, wherein the connection slots are provided on the legs of the U-shaped profile and wherein the slats generally extend from a first leg of the U-shaped profile to a second leg of the U-shaped profile, which is opposed to the first leg. Such a basic component is easy to manufacture. Furthermore, the slats can conveniently be arranged in a desired geometry.

The connection slots can be open towards an end of the respective leg. This means that the slots are generally U-shaped. Consequently, the slats can be mounted to the basic component from above. More precisely, the basic component can be placed on an assembly support and the slats can be introduced in the slots by a substantially vertical movement. This assembly activity can be performed without tools.

Alternatively, the connection slots are openings in the respective leg. This means that the slots are generally O-shaped. Consequently, the slots are closed on all lateral sides. Therefore, the slats can be positioned in a very precise manner on the basic component. During an assembly process the tongues are introduced into the openings. It can be necessary to slightly bend the slats in order to introduce the tongues into the openings. All in all, a very reliable connection between the slats and the basic component is provided.

Advantageously, each connection tongue is associated with a vertical positioning surface being arranged on the corresponding slat and being adapted to position the slat in a vertical direction with respect to the basic component. Consequently, the slats are precisely positioned with respect to the basic component. Additionally, the assembly process does not need adjustment steps.

The vertical positioning surface can abut against an end of the corresponding leg of the basic component, a ground surface of a corresponding connection slot and/or a ground surface of the basic component. The basic component is preferably a U-shaped profile. All alternatives guarantee that the slats are precisely positioned with respect to the basic component.

Preferably, each connection tongue is associated with a horizontal positioning surface being arranged on the corresponding slat and being adapted to position the slat in a horizontal direction with respect to the basic component. Consequently, the slats are precisely positioned with respect to the basic component in a horizontal direction. Furthermore, also in the horizontal direction, no adjustment steps are needed during the process of assembly.

The horizontal positioning surface can be arranged above or under the corresponding connection tongue or the horizontal positioning surface can comprise a first section being arranged above the corresponding connection tongue and a second section being arranged under the corresponding connection tongue. All alternatives guarantee that the slats are precisely positioned with respect to the basic component.

In a variant the slats are preloaded with respect to the basic component, especially wherein a compressive preload force is applied to the slats by the legs of the basic component. Of course, then the slats apply a corresponding reaction force to legs. Preloading guarantees a defined position of the slats within the basic component. Furthermore it prevents undesired noises such as rattling. Preferably, the preload force is applied to the slats via the horizontal positioning surfaces.

In an alternative the slats are fixed to the basic component by gluing, especially wherein a glued connection is established between the first leg and/or the second leg of the basic component and the slat. Consequently, the slats are reliably secured to the basic component. Also a glued connection prevents undesired noises such as rattling.

The two types of slots can be arranged in an alternating manner in a direction of general extension of the support device.

In an alternative solution all slats are generally identical, wherein each slat comprises a connection tongue of a first type being engageable with connection slots of the first type, but not with connection slots of the second type and a connection tongue of a second type being engageable with connection slots of the second type, but not with connection slots of the first type and wherein the slats are arranged on the basic component in alternating orientations. These slats are asymmetrical. The advantage of this embodiment compared to the embodiment with two different types of slats is a more economic production of the slats as only one type has to be produced.

Preferably, the side contour contact sections comprise teeth, wherein the teeth of neighboring slats are offset with respect to each other. The contact area between a slat without teeth and a packaging material is substantially a line or a narrow but long rectangle. By introducing teeth, the contact area is shrunk to a plurality of point contacts. Consequently, the area of contact is further reduced, which leads to a reduction of the fume deposition phenomenon.

Teeth of neighboring slats can be offset by half the distance between two neighboring teeth on one slat, i.e. teeth of one slat are always in front of gaps between teeth of a neighboring slat. This leads to a special distribution of the point contacts, which is advantageous with respect to bending or kinking of packaging material.

Figure 3:
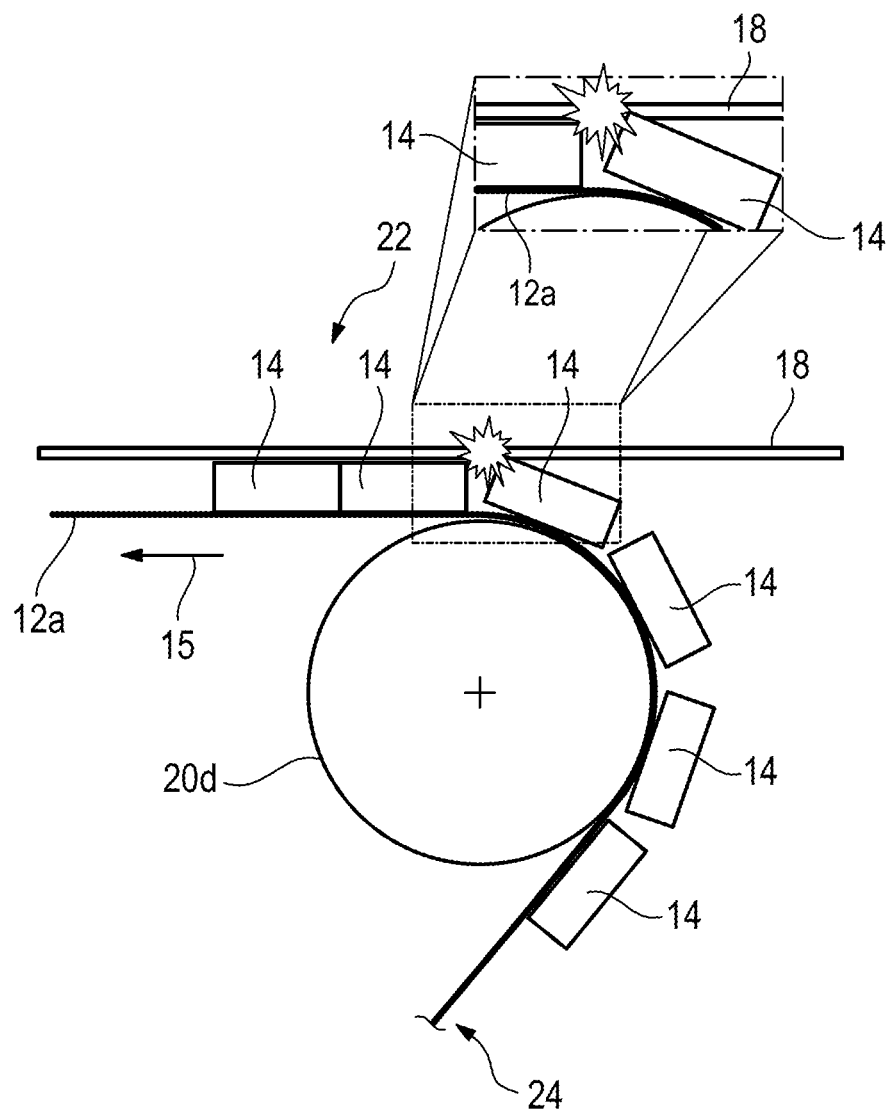
Figure 4:
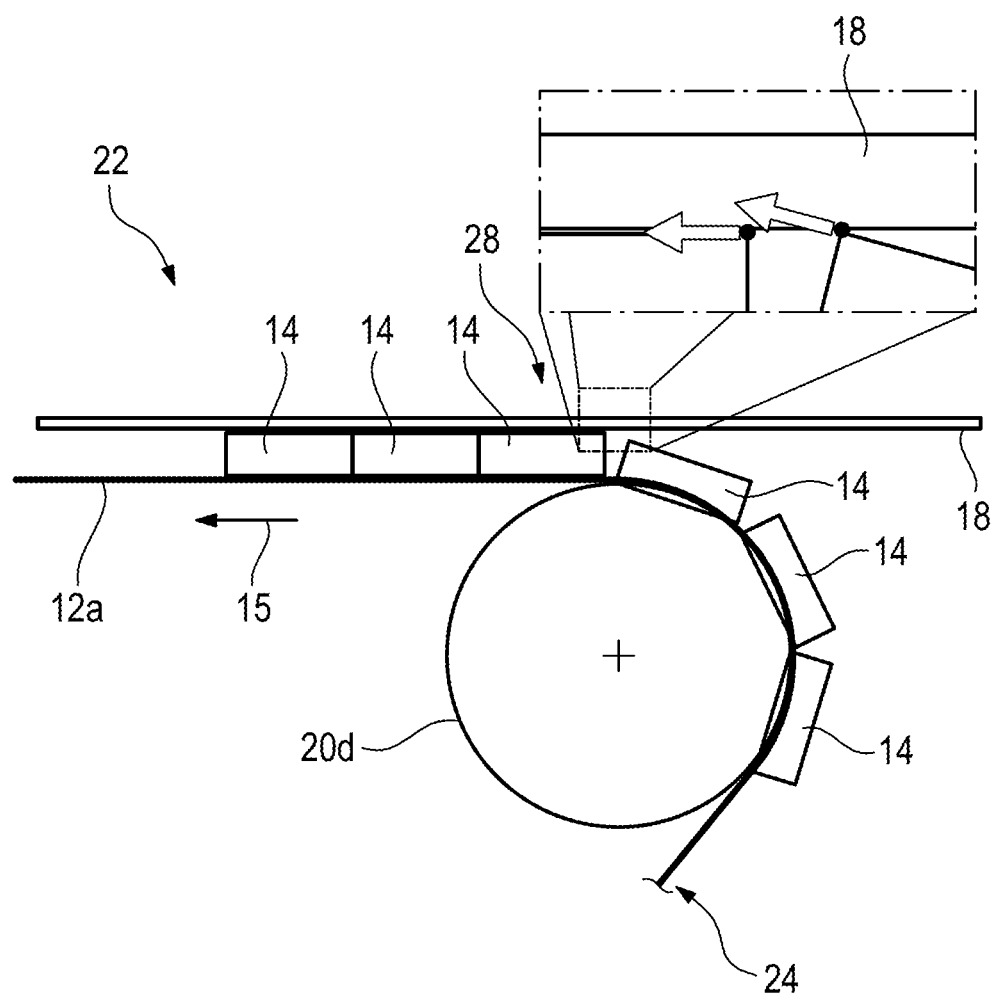
Figure 5:
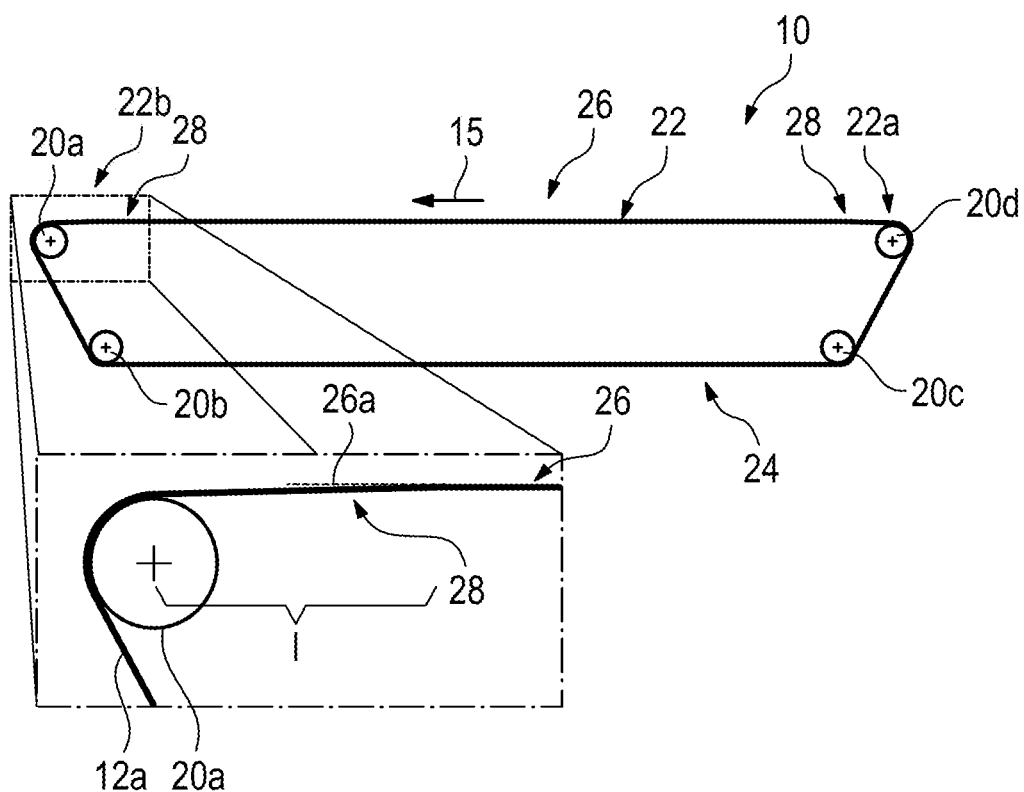
Figure 6:
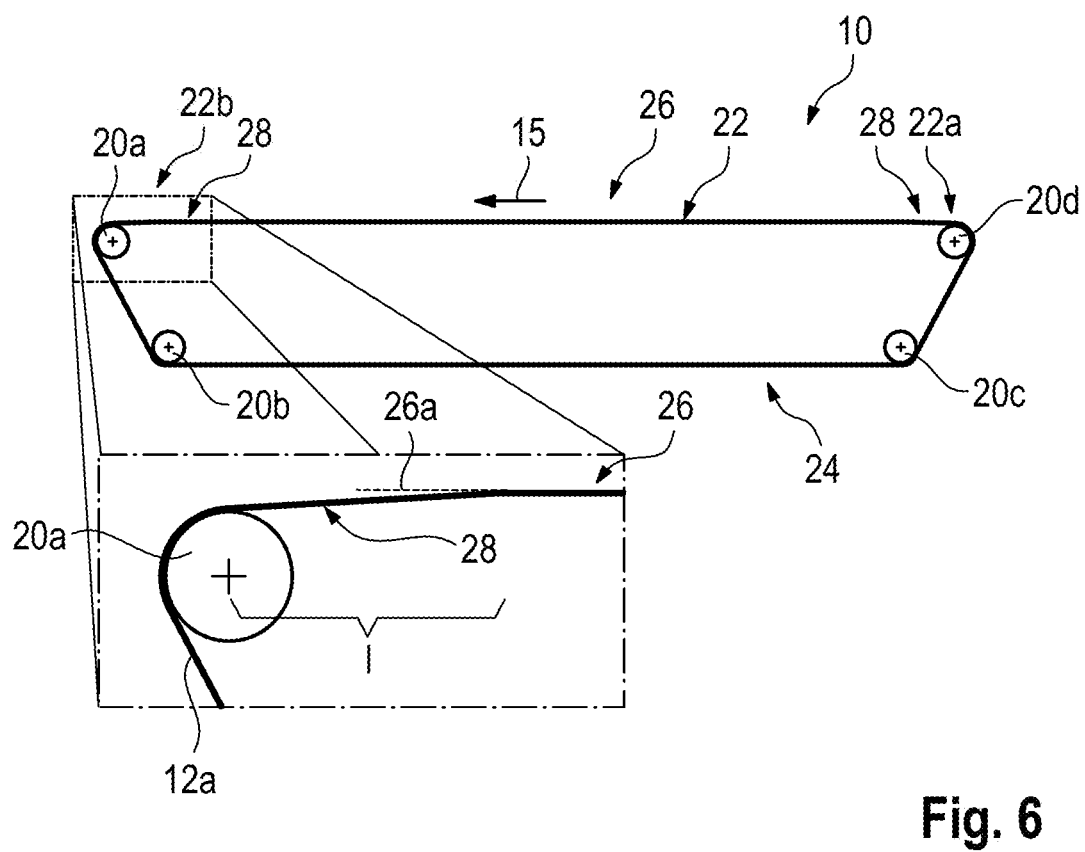
Figure 7:
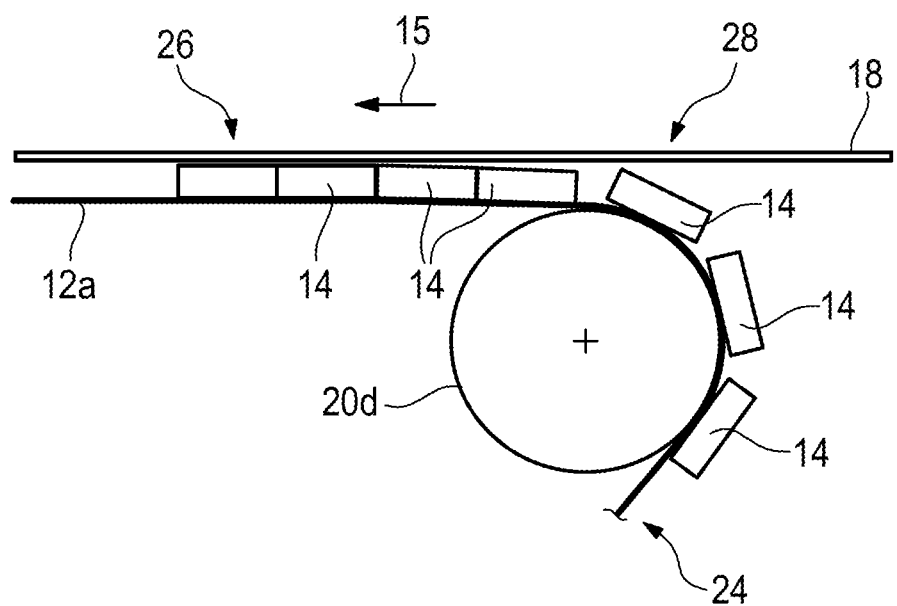
Figure 8:
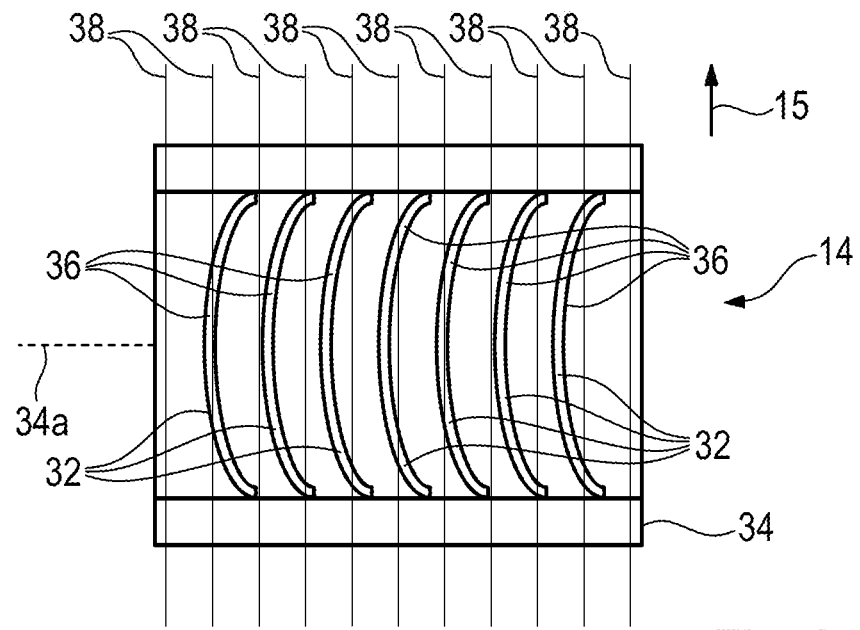
Figure 9:
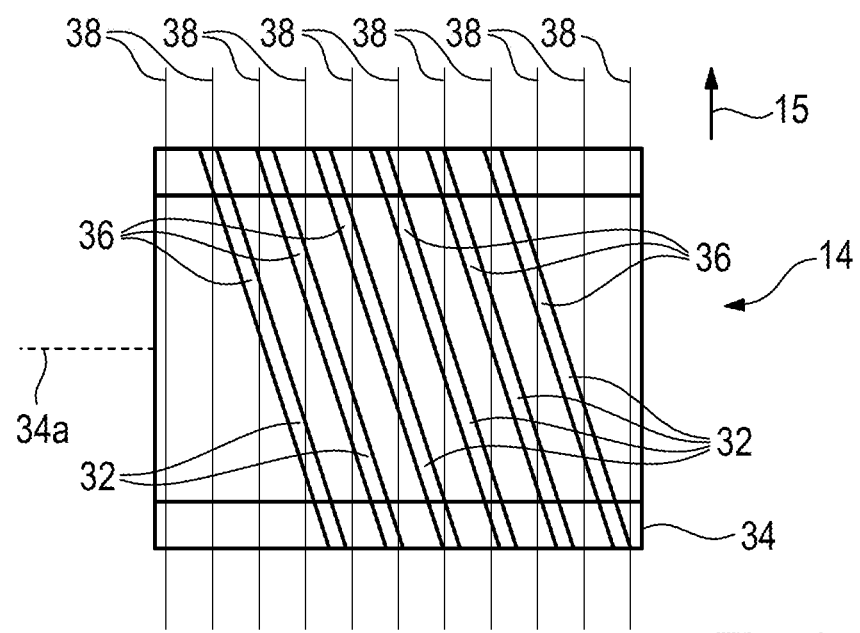
Figure 10:
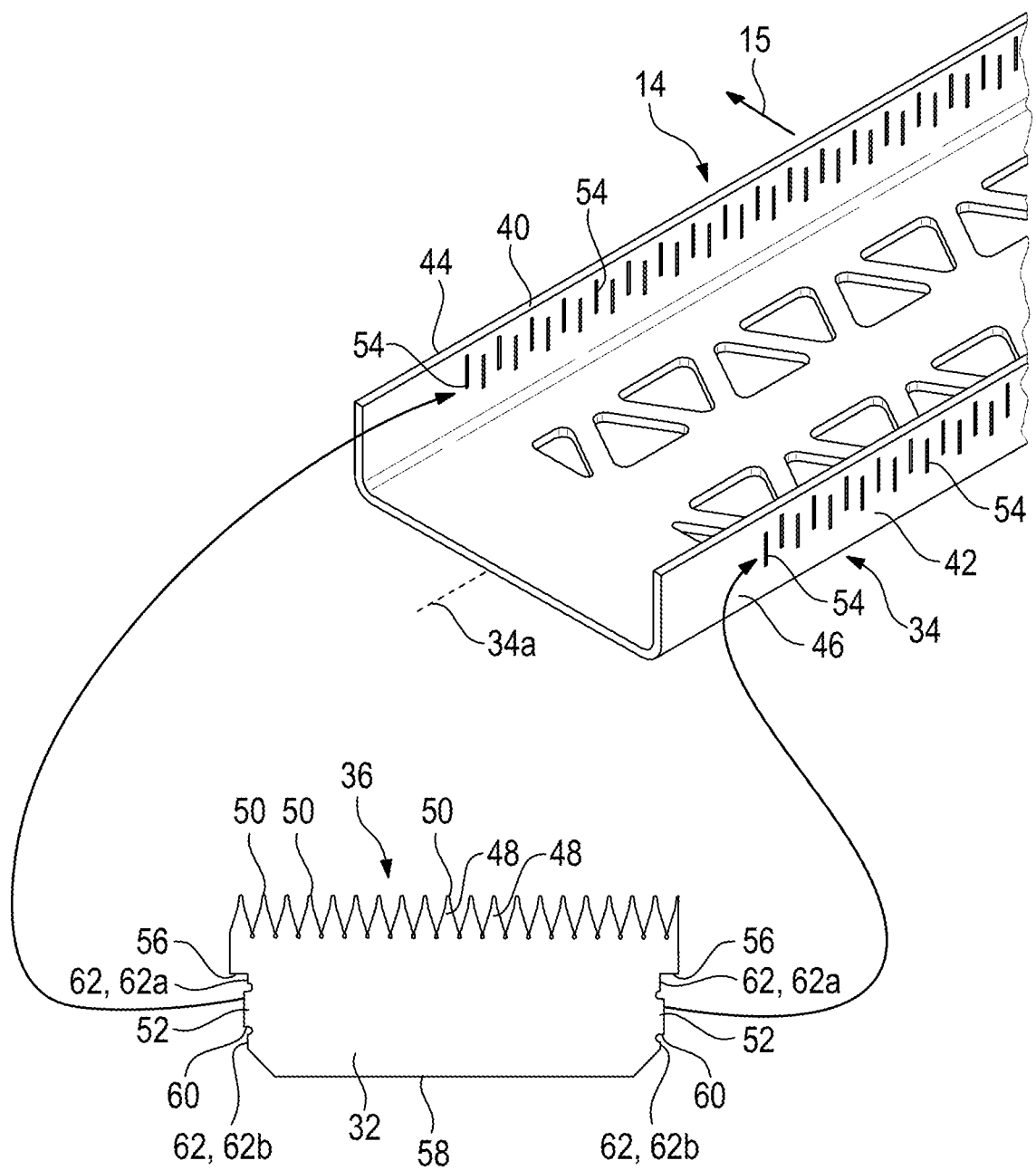
Figure 11:
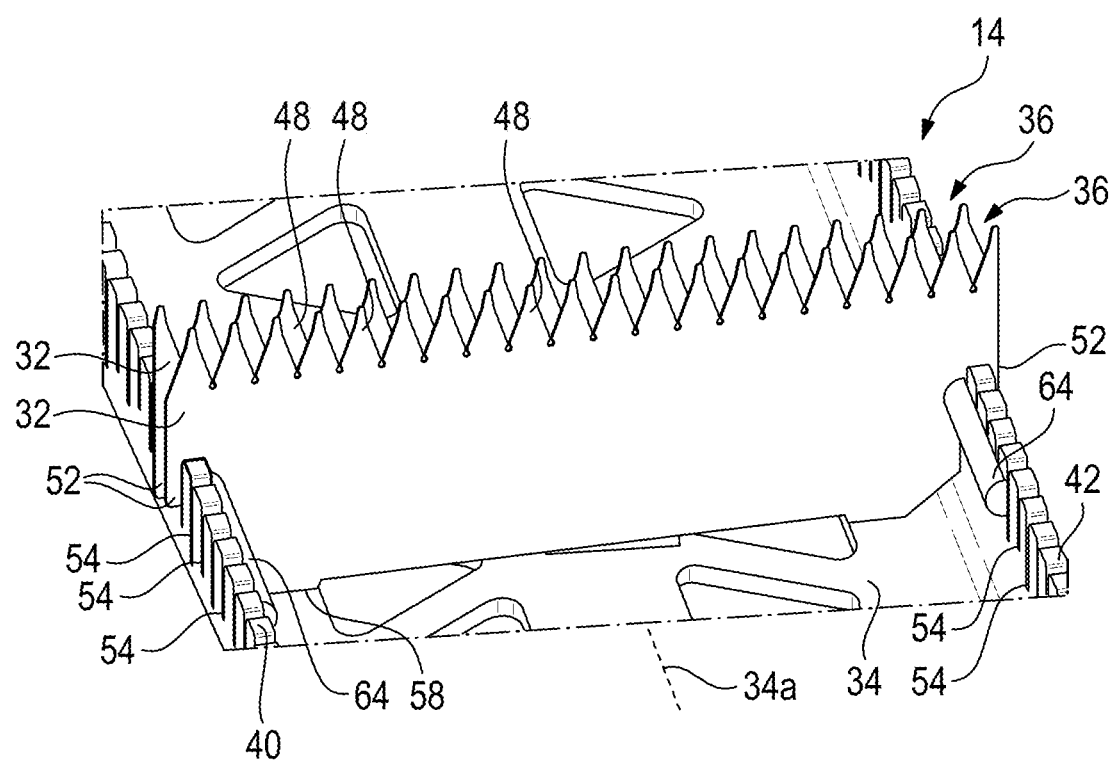
Figure 12:
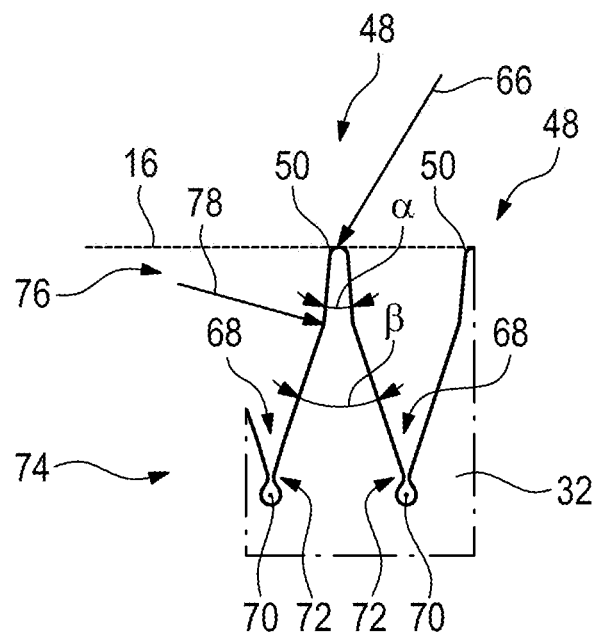
Figure 13:
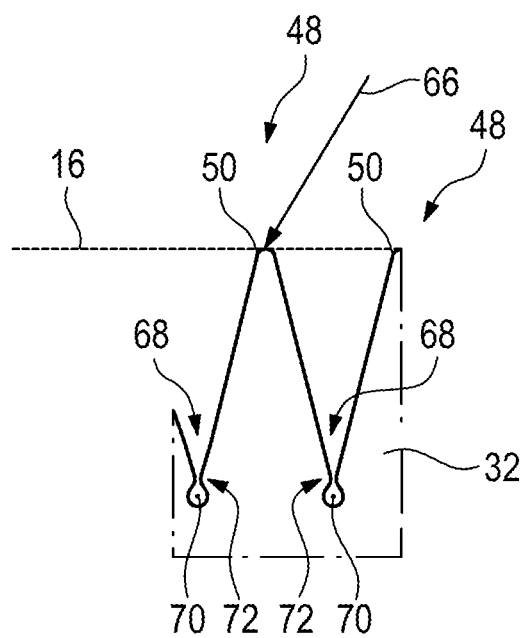

The invention will now be explained with reference to several embodiments which are shown in the attached drawings. In the drawings, FIG. 1 shows a schematic overview of a conveyor belt assembly according to the invention in an exploded view, FIG. 2 shows a detail of the conveyor belt assembly according to FIG. 1, FIG. 3 shows the functional principle of a known conveyor belt assembly, FIG. 4 shows an alternative functional principle of another known conveyor belt assembly, FIG. 5 shows the geometry of a transition section of a conveyor belt assembly according to the invention, FIG. 6 shows an alternative geometry of a transition section of a conveyor belt assembly according to the invention, FIG. 7 shows a detailed overview of a conveyor belt assembly according to the invention, FIG. 8 shows an embodiment of a support device according to the invention, FIG. 9 shows an alternative embodiment of a support device according to the invention, FIG. 10 shows an exploded view of a support device according to the invention, wherein only one exemplary slat is shown, FIG. 11 shows an alternative embodiment of a support device according to the invention, wherein two exemplary slats are shown, FIG. 12 shows a detailed view of a tooth of a support device according to the invention, and FIG. 13 shows a detailed view of an alternative tooth of a support device according to the invention.

FIG. 1 shows a conveyor belt assembly 10 for transporting single sheets or stacks of packaging material.

Figure 2:
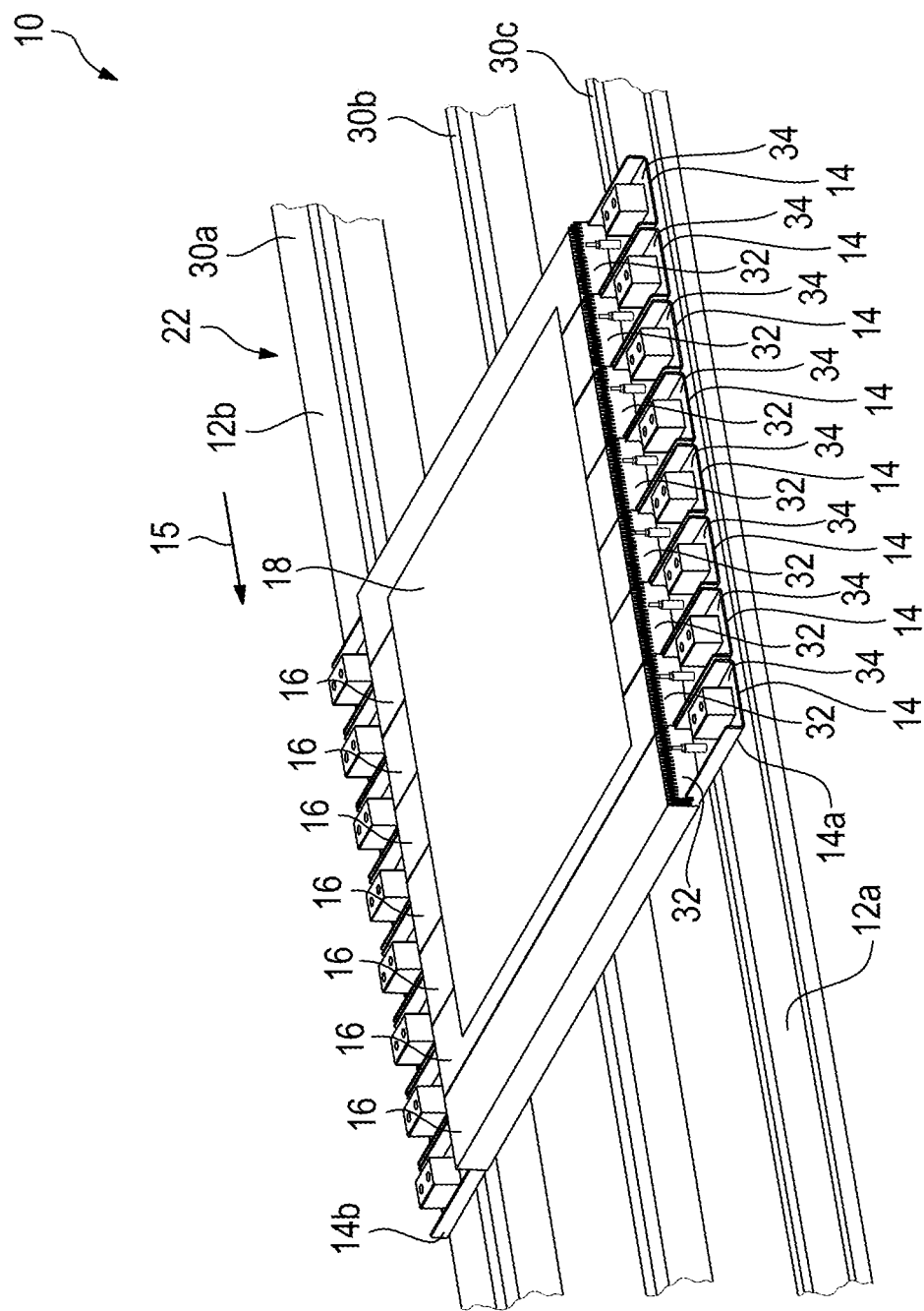

It comprises two conveyor belts 12a, 12b which are arranged in a substantially parallel manner (cf. FIG. 2).

On the conveyor belts 12a, 12b a plurality of support devices 14 are mounted.

More precisely, a first end 14a of each of the support devices 14 is attached to a first conveyor belt 12a and a second end 14b of each of the support devices 14 is attached to a second conveyor belt 12b.

The support devices 14 extend substantially perpendicular to the conveyor belts 12a, 12b and a conveying direction 15.

The support devices 14 are substantially rigid and each of them provides a support surface 16 configured to support the single sheets or stacks of packaging material.

In the figures a single sheet 18 of packaging material can be seen. It is also representative of stacks of packaging material.

In order to convey the sheets or stacks of packaging material, the conveyor belts 12a, 12b are arranged over pulleys 20a, 20b, 20c, 20d (cf. FIGS. 4 to 7).

For each conveyor belt at least one of the pulleys 20a to 20d is adapted to drive the corresponding conveyor belt 12a, 12b in the conveying direction 15.

The pulleys 20a to 20d have diameters of 100 mm to 300 mm.

In the example shown, the conveyor belt assembly 10 comprises four pulleys 20a to 20d, wherein the respective axis of rotation of the pulleys 20a to 20d are substantially parallel.

As can especially be seen from FIGS. 5 and 6, the pulleys 20a to 20d are arranged in a substantially trapezoidal manner, when seen in the direction of the axis of rotation.

The area of movement of the conveyor belts 12a, 12b and the support devices 14 mounted thereon can be subdivided into different sections.

A conveying section 22 is adapted for transporting the sheets 18 or stacks of packaging material.

A return section 24 is adapted to return the conveyor belts 12a, 12b from an end 22b of the conveying section 22 to a beginning 22a of the conveying section 22.

In the example the return section 24 comprises return section elements 24a, 24b and 24c, wherein return section element 24c is arranged adjacent to the beginning 22a of the conveying section 22 and return section element 24a is neighboring the end 22b of the conveying section 22.

The conveying section 22 can be subdivided into a middle section 26 in which the conveyor belts 12a, 12b are arranged in a substantially flat manner and a transition section 28.

In the transition section 28 the conveyor belts 12a, 12b are arranged in a retracted position with respect to a plane 26a defined by the middle section 26.

In the example the conveyor belt assembly 10 comprises two transition sections 28, wherein one is arranged at the beginning 22a of the conveying section 22 and one is arranged at the end 22b of the conveying section 22.

It is noted that in FIG. 1 only an enveloping geometry is shown, in which the conveyor belts 12a, 12b and the support devices 14 are movable.

In the embodiment according to FIG. 5 the transition section 28 has a curved shape with a radius of approximately 4 m. This means that between the middle section 26 and the area, where the conveyor belts 12a, 12b are in contact with the pulley 20a, the conveyor belts 12a, 12b and the support devices 14 mounted thereon move on a portion of a circle line.

In the alternative embodiment shown in FIG. 6 the transition section 28 is plane, but inclined with respect to the middle section 26.

Also a combination of the embodiments shown in FIGS. 5 and 6 is possible, i. e. the transition section 28 comprises a curved section with a radius and a plane, but inclined section.

The transition section 28 has a length l, which is between 50 mm and 600 mm when measured in the conveying direction 15.

In a preferred embodiment, a curved section with a radius of about 4 m and a length of about 200 mm is interposed between two straight sections.

In order to move the conveyor belts 12a, 12b and especially the support devices 14 mounted thereon on the geometry described above, guide rails 30a, 30b, 30c are provided in the conveying section 22.

The guide rails 30a, 30b, 30c are made of a low friction material and the support devices 14 are in sliding connection with the guide rails 30a, 30b, 30c, when located in the conveying section 22.

The effect produced by the conveyor belt assembly 10 can best be understood from FIGS. 3, 4 and 7.

All three figures show conveyor belt 12a and a selection of support devices 14 mounted thereon, which are about to move from the return section 24 to the conveying section 22.

In the prior art solution shown in FIG. 3, the support devices 14, more precisely the leading edges of the support devices 14, will make contact with the sheet 18 of packaging material, when being tilted in order to arrive in the conveying section 22.

The contact between the leading edges of the support devices 14 and the sheet 18 of packaging material is due to the radius of the pulley 20d. The support devices 14 are rigid and therefore cannot be bent by the radius of the pulley. Consequently, they are arranged in a tangential manner.

In the prior art solution shown in FIG. 4 the support devices 14 are attached to the conveyor belt 12a in a different manner. This leads to the fact that in the area where the support devices 14 are being tilted in order to arrive in the conveying section 22 neighboring trailing edges and leading edges move at different speeds. At the same time, both edges are in contact with the sheet 18 of packaging material.

In the cases shown in FIGS. 3 and 4 the sheet 18 of packaging material risks to be damaged.

As can be seen from FIG. 7, a transition section 28 is provided, wherein the conveyor belt 12a is arranged in a retracted position with respect to the plane 26a defined by the middle section 26.

Therefore, in the area where the support devices 14 are tilted into the conveying section 22 and leave contact with the pulley 20d at the same time, a gap between the sheet 18 of packaging material and the support devices 14, especially their leading edge is provided.

As a consequence thereof, damage of the sheet 18 of packaging material can effectively be prevented.

FIGS. 8 and 9 show a detailed view of two embodiments of support devices 14.

As already has been explained, one or more support devices 14 are mounted on the conveyor belts 12a, 12b in order to transport single sheets or stacks of packaging material.

All support devices 14 of the conveyor assembly 10 can be generally identical, e. g. of the type shown in FIG. 8 or FIG. 9.

Alternatively, different groups of support devices 14 can be mounted on the conveyor belts 12a, 12b, wherein the support devices 14 belonging to the same group are generally identical and the support devices of different groups are generally different.

For example, five support devices 14 according to FIG. 8 can form a first group and five support devices according to FIG. 9 can form a second group. First groups and second groups can be mounted in an alternating manner on the conveyor belts 12a, 12b.

Generally speaking, each support device 14 comprises a multitude of slats 32 being arranged on a basic component 34.

On this basic component 34 the slats 32 are arranged in an upright position and spaced from each other such that respective side contour contact sections 36 of the slats 32 form the substantially flat support surface 16 configured to support the single sheets 18 or stacks of packaging material (see also FIGS. 10 and 11).

As can be seen from FIGS. 8 and 9 all slats 32 are arranged in a substantially parallel manner on the basic component 34. In this context parallel means that a distance between two neighboring slats 32 is constant.

At the same time the slats 32 extend obliquely with respect to a direction 34*a* of general extension of the basic component 34.

In FIGS. 8 and 9 auxiliary lines 38 are oriented perpendicular to the direction 34*a* of general extension of the basic component 34.

Consequently, the slats 32 extend neither perpendicular nor parallel to the direction 34*a*.

As has already been explained, the conveying direction 15 is generally perpendicular to the direction 34*a*. Therefore, the slats are also oriented obliquely with respect to the conveying direction 15.

In the embodiment of FIG. 9 the slats are substantially straight.

The angle of rotation of the slats 32 with respect to the direction 34*a* is exaggerated. In reality this angle is about 0.5° to 15°. In an especially preferred embodiment it is 0.5° to 5°.

For the embodiment of FIG. 8 the slats 32 are crescent-shaped, the radius of curvature being substantially equal for all slats 32, but not oriented obliquely with respect to the conveying direction 15.

As can best be seen from FIG. 10 the basic component 34 is a U-shaped profile, wherein the slats 32 generally extend from a first leg 40 to a second leg 42 of the U-shaped profile being opposed to the first leg 40.

In order to achieve the oblique positions of the slats 32, a connection area 44 on the first leg 40 is offset from a connection area 46 on the second leg 42, when measured with respect to the direction 34*a* of general extension of the basic component 34.

Furthermore, the slats 32 are preloaded with respect to the basic component 34. In this context a compressive preload force is applied to the slats 32 by the legs 40, 42 of the basic component 34.

The slats 32 are preferably made from a steel material, especially from a stainless steel material. Alternative materials include aluminum, copper, molybdenum and alloys thereof.

The tips 50 of the teeth 48 form the substantially flat support surface 16.

In the following the assembly of the slats 32 to the respective basic component 34 will be explained in detail.

A first embodiment thereof is shown in FIG. 10.

Each slat 32 is mounted to the basic component 34 by two connection tongues 52, which are arranged on opposite ends of the slat 32. In the assembled state, the connection tongues 52 engage corresponding connection slots 54, whereas only some of the slots 54 are equipped with a reference sign.

As already explained above, the basic component 34 is a U-shaped profile and the connection slots 54 are provided on the legs 40, 42 of the U-shaped profile.

Consequently, the slats 32 generally extend from the first leg 40 to the second leg 42 of the U-shaped profile.

In the embodiment according to FIG. 10 the slots 54 are openings, which means that they are closed on all lateral sides.

During assembly the slats 32 are slightly bent and introduced in the middle section of the U-shaped profile. When the tongues 52 are in the proximity of a corresponding slot 54, a bending force is released and the slats 32 return elastically to their straight original form. At the same time the tongues 52 move into the corresponding slots 54.

In order to vertically position the slats 32 with respect to the basic component 34 each connection tongue 52 is associated with a vertical positioning surface 56, which is arranged on the corresponding slat 32.

In the example shown the vertical positioning surface 56 abuts against an end of the corresponding leg 40, 42 of the basic component 34.

Alternatively, a lower surface 58 of the slats 32 can act as a vertical positioning surface, which then abuts against a ground surface of the basic component 34 in an assembled state.

In a further alternative, vertical positioning surfaces 60 can be provided on the tongues 52. Such vertical positioning surfaces 60 are adapted to cooperate with a ground surface of a corresponding connection slots 54.

The slats 32 also need to be positioned in a horizontal direction.

To this end each connection tongue 52 is associated with a horizontal positioning surface 62, which is arranged on the corresponding slat 32.

In the example shown in FIG. 10 the horizontal positioning surface 62 comprises a first section 62*a* which is arranged above the corresponding connection tongue 52 and a second section 62*b* which is arranged under the corresponding connection tongue 52.

As can best be seen from FIG. 10, two types of slots 54 are provided on the basic component 34 wherein the first type of slot is arranged closer to a basic surface of the basic component 34 than a second type of slot.

The two types of slots 54 are arranged in an alternating manner, when seen in the direction 34*a*.

The different types of slots 54 are adapted to cooperate with different types of connection tongues 52.

In the example shown in FIG. 10 the connection tongue 52 shown on the right side of the slat 32 is arranged closer to the lower surface 58 than the connection tongue 52 shown on the left side of the slat 32. Consequently, two different types of connection tongues 52 are arranged on one slat 32. In other words, the slat 32 is asymmetrical.

Consequently, the slat 32 always cooperates with two slots 54 of different types.

As the types of slots 54 are arranged in an alternating manner, the slats 32 are mounted in alternating orientations. Thereby, a first orientation is for example the orientation shown in FIG. 10.

To change the orientation of the slat 32 it is turned by 180° with respect to a vertical axis.

Thereby, the teeth 48 provided on neighboring slats 32 can be arranged in an offset manner (only represented for the embodiment of FIG. 11).

Alternatively, two different types of slats 32 can be used (not shown). Then, a first type of slats 32 is engageable with a first type of slots 54, but not with the second type of slots 54 and a second type of slats 32 is only engageable with a second type of slots 54, but not with the first type of slots 54.

The first type of slats 32 and the second type of slats 32 can for example differ in the relative position of the teeth 48 on the slats.

Also by this means the teeth 48 provided on neighboring slats 32 can be arranged in an offset manner (only represented for the embodiment of FIG. 11).

FIG. 11 shows a different embodiment, in which the connection slots 54 are open towards an end of the respective leg 40, 42.

In order to mount the slats 32 in the connection slots 54, they are moved in a vertical direction.

Additionally, the slats 32 can be fixed to the basic component 34 by gluing. In the example shown, a gluing connection 64 is provided on both the first leg 40 and the second leg 42 of the basic component 34.

As already explained in connection with the embodiment of FIG. 10 also the embodiment of FIG. 11 comprises two types of slots 54 being able to cooperate with two different types of connection tongues 52 respectively. As in the embodiment of FIG. 10 each of the slats 32 comprises one connection tongue 52 of the first type and one of the second type.

The two slats 32 represented in FIG. 11 are mounted on the basic component 34 in opposed orientations (see especially half tooth).

The horizontal positioning surfaces 62 and vertical positioning surfaces 56 of the embodiment according to FIG. 11 correspond to the surfaces explained in relation to the embodiment of FIG. 10.

As can be seen from the above, each support device 14 comprises a multitude of teeth 48. More precisely, on each slat 32 a plurality or group of teeth 48 is formed, wherein the tips 50 of the teeth 48 form the substantially flat support surface 16 configured to support the single sheets or stacks of packaging material.

In FIG. 13 a first embodiment of the tooth 48 is shown in detail.

All teeth 48 have a substantially triangular shape and extent substantially orthogonal to the support surface 16, wherein the extension of a tooth 48 is defined from a tooth base to the tooth tip 50.

The teeth 48 are substantially 0.5 mm to 10 mm wide, 0.2 mm to 1.0 mm thick and 1 mm to 15 mm high. Preferably, the teeth are 2 mm to 8 mm wide and 3 mm to 15 mm high.

The thickness of the teeth 48 corresponds to the thickness of the slat 32 on which the teeth 48 are formed e.g. by cutting, embossing or stamping.

The tooth tip 50 is rounded by a radius 66 of approximately 0.15 mm.

Neighboring teeth 48 are separated by a gap 68. In the examples shown, on a side of the gap 68, which opposes the tooth tip 50, a recess 70 is arranged.

This recess 70 is at least partly rounded, wherein the rounded portion has a radius of about 0.3 mm.

Furthermore, the recess 70 forms an undercut with respect to the neighboring teeth 48.

Also a transition zone 72 between the recess and the rest of the tooth 48 can be rounded, e.g. by a radius of about 0.15 mm.

The tooth 48 shown in FIG. 13 comprises a base section 74 and a tip section 76. In the tip section 76 an angle α between corresponding tooth flanks is smaller than an angle β between corresponding tooth flanks in the base section 74.

In the example shown, the angle α is approximately 10° and the angle β is approximately 40°.

In terms of proportions the height of the base section 74 is about 2 to 5 times the height of the tip sections 76.

The flanks of the teeth 48 are generally planar.

In the embodiment of FIG. 13, the flank sections comprised in the base section 74 and the flank sections comprised in the tip section 76 are substantially planar.

The transition from the base section 74 to the tip section 76 comprises a radius 78, which is approximately 0.6 mm in the example shown.

FIG. 14 shows a tooth 48 according to a second embodiment. The structure of this tooth 48 is simplified with respect to the embodiment of FIG. 13 in that it does not show a distinct base section and tip section.

Preferably, the teeth 48 on one slat 32 are shaped identically.

Furthermore, it is preferred that the teeth 48 on one support device 14 are all shaped identically.

The invention claimed is:

1. A support device for storing or transporting single sheets or stacks of a packaging material, the support device comprising:
a multitude of slats being arranged on a basic component, wherein the slats are in an upright position and spaced from each other in a generally parallel manner such that respective side contour contact sections of the slats form a substantially flat support surface configured to support the single sheets or stacks, wherein each slat is mounted on the basic component via two connection tongues being arranged on opposite ends of the slat, the connection tongues engaging corresponding connection slots being provided on the basic component, wherein two types of slots are provided on the basic component, wherein a first type of slots is arranged closer to a basic surface of the basic component than a second type of slots, and wherein two types of slats are provided, wherein a first type of slats is engageable with connection slots of the first type, but not with connection slots of the second type, and a second type of slats is engageable with connection slots of the second type, but not with connection slots of the first type.

2. The support device of claim 1, wherein the basic component is a U-shaped profile, wherein the connection slots are provided on the legs of the U-shaped profile and wherein the slats generally extend from a first leg of the U-shaped profile to a second leg of the U-shaped profile, which is opposed to the first leg.

3. The support device of claim 2, wherein the connection slots are open towards an end of the respective leg.

4. The support device of claim 2, wherein the connection slots are openings in the respective leg.

5. The support device of claim 1, wherein each connection tongue is associated with a vertical positioning surface being arranged on the corresponding slat and being adapted to position the slat in a vertical direction with respect to the basic component.

6. The support device of claim 5, wherein the vertical positioning surface abuts against an end of the corresponding leg of the basic component, a ground surface of a corresponding connection slot and/or a ground surface of the basic component.

7. The support device of claim 1, wherein each connection tongue is associated with a horizontal positioning surface being arranged on the corresponding slat and being adapted to position the slat in a horizontal direction with respect to the basic component.

8. The support device of claim 7, wherein the horizontal positioning surface is arranged above or under the corresponding connection tongue or wherein the horizontal positioning surface comprises a first section being arranged above the corresponding connection tongue and a second section being arranged under the corresponding connection tongue.

9. The support device of claim 1, wherein the slats are preloaded with respect to the basic component, wherein a compressive preload force is applied to the slats by the legs of the basic component.

10. The support device of claim 1, wherein the slats are fixed to the basic component by gluing, wherein a glued connection is established between the first leg and/or the second leg of the basic component and the slat.

11. The support device of claim 1, wherein the two types of slots are arranged in an alternating manner in a direction of general extension of the support device.

12. The support device of claim 1, wherein all slats are generally identical, wherein each slat comprises a connection tongue of a first type being engageable with connection slots of the first type, but not with connection slots of the second type and a connection tongue of a second type being engageable with connection slots of the second type, but not with connection slots of the first type and wherein the slats are arranged on the basic component in alternating orientations.

13. The support device of claim 1, wherein the side contour contact sections comprise teeth, wherein the teeth of neighboring slats are offset with respect to each other.

* * * * *